US008383565B2

(12) United States Patent
Albright et al.

(10) Patent No.: US 8,383,565 B2
(45) Date of Patent: *Feb. 26, 2013

(54) COLOR CHANGING PAINT AND VARNISH REMOVER

(75) Inventors: Robert L. Albright, Southampton, PA (US); Noel Newman, Jackson, NJ (US); Daniel Cohen, Manalapan, NJ (US)

(73) Assignee: Sunnyside Corporation, Wheeling, IL (US)

( * ) Notice: Subject to any disclaimer, the term of this patent is extended or adjusted under 35 U.S.C. 154(b) by 452 days.

This patent is subject to a terminal disclaimer.

(21) Appl. No.: 11/699,789

(22) Filed: Jan. 31, 2007

(65) Prior Publication Data

US 2007/0129276 A1     Jun. 7, 2007

Related U.S. Application Data

(63) Continuation-in-part of application No. 11/280,594, filed on Nov. 17, 2005, now Pat. No. 7,304,021.

(51) Int. Cl.
*C11D 3/44* (2006.01)

(52) U.S. Cl. ........ 510/201; 510/202; 510/206; 510/500; 134/38

(58) Field of Classification Search ............ 510/201, 510/202, 206, 500; 134/38
See application file for complete search history.

(56) References Cited

U.S. PATENT DOCUMENTS

| | | | |
|---|---|---|---|
| 4,120,180 A | 10/1978 | Jedora | |
| 4,231,805 A | 11/1980 | Petterson et al. | |
| 4,502,891 A | 3/1985 | Brocklehurst et al. | |
| 4,572,792 A | 2/1986 | Muller | |
| 4,579,627 A | 4/1986 | Brailsford | |
| 4,645,617 A | 2/1987 | Vivian | |
| 4,666,626 A | 5/1987 | Francisco | |
| 4,732,695 A | 3/1988 | Francisco | |
| 4,749,510 A | 6/1988 | Nelson | |
| 5,006,279 A | 4/1991 | Grobbel et al. | |
| 5,011,621 A | 4/1991 | Sullivan | |
| 5,015,410 A | 5/1991 | Sullivan | |
| 5,035,839 A | 7/1991 | Dorsch et al. | |
| 5,049,300 A | 9/1991 | Fusiak et al. | |
| 5,049,314 A * | 9/1991 | Short .......................... 510/212 | |
| 5,073,289 A | 12/1991 | Collier et al. | |
| 5,098,591 A | 3/1992 | Stevens | |
| 5,098,592 A | 3/1992 | Narayanan et al. | |
| 5,124,062 A | 6/1992 | Stevens | |
| 5,154,848 A | 10/1992 | Narayanan et al. | |
| 5,167,853 A | 12/1992 | Stevens | |
| 5,188,675 A * | 2/1993 | Dormon-Brailsford .......... 134/4 |
| 5,215,675 A * | 6/1993 | Wilkins et al. ................ 510/206 |
| 5,298,184 A | 3/1994 | Jarema | |
| 5,310,496 A | 5/1994 | Taylor | |
| 5,413,729 A * | 5/1995 | Gaul .............................. 510/206 |
| 5,425,893 A | 6/1995 | Stevens | |
| 5,427,710 A | 6/1995 | Stevens | |
| 5,518,661 A * | 5/1996 | Langford et al. ............. 252/364 |
| 5,565,136 A | 10/1996 | Walsh | |
| 5,569,410 A * | 10/1996 | Distaso ......................... 510/202 |
| 5,597,788 A | 1/1997 | Stevens | |
| 5,605,579 A | 2/1997 | Distaso | |
| 5,696,072 A * | 12/1997 | Nercissiantz et al. ........ 510/206 |
| 5,744,438 A | 4/1998 | Distaso | |
| 5,851,278 A * | 12/1998 | Stanforth et al. ........ 106/287.25 |
| 5,932,530 A * | 8/1999 | Radu et al. .................... 510/212 |
| 5,952,277 A * | 9/1999 | Radu et al. .................... 510/212 |
| 5,990,062 A * | 11/1999 | Summerfield et al. ........ 510/204 |
| 6,040,284 A | 3/2000 | Marquis et al. | |
| 6,096,699 A | 8/2000 | Bergemann et al. | |
| 6,159,915 A | 12/2000 | Machac, Jr. et al. | |
| 6,162,776 A | 12/2000 | Marquis et al. | |
| 6,169,061 B1 | 1/2001 | Machac, Jr. et al. | |
| 6,239,090 B1 | 5/2001 | Marquis et al. | |
| 6,369,009 B1 | 4/2002 | Machac, Jr. et al. | |
| 6,428,628 B1 | 8/2002 | Umemoto | |
| 6,482,270 B1 | 11/2002 | Machac, Jr. et al. | |
| 6,548,464 B1 | 4/2003 | Machac, Jr. et al. | |
| 6,586,380 B2 | 7/2003 | Marquis et al. | |
| 6,624,222 B2 | 9/2003 | Kestyn et al. | |
| 6,790,891 B2 | 9/2004 | Kestyn et al. | |
| 2001/0036988 A1 * | 11/2001 | Kestyn et al. ................. 524/314 |
| 2004/0138077 A1 * | 7/2004 | Pageau et al. ................ 510/201 |
| 2005/0227889 A1 * | 10/2005 | Shireman ...................... 510/201 |
| 2006/0089281 A1 * | 4/2006 | Gibson ......................... 510/201 |
| 2006/0229220 A1 * | 10/2006 | Hawes et al. ................. 510/201 |
| 2007/0049510 A1 * | 3/2007 | Fujii et al. .................... 510/201 |

* cited by examiner

*Primary Examiner* — Charles Boyer
(74) *Attorney, Agent, or Firm* — Dan DeLa Rosa

(57) ABSTRACT

A color change paint and varnish removal formulation is provided. The formulation comprises: at least one penetrant, at least one water insoluble carrier and at least one color visible colorant whereby the formulation is applied to the target area and as the surface of the formulation dries, the penetrant migrates away from the dehydrating surface and a surface crust of beads is formed; the beads have a particle size that allows the scattering of visible light into white light and produces the whitening and dilution of the visible color and thus, there is a color change to indicate that the stripping action of the formulation has ceased and is ready for the scraping and removal step.

20 Claims, No Drawings

COLOR CHANGING PAINT AND VARNISH REMOVER

RELATED APPLICATION

This application is a continuation-in-part of U.S. application Ser. No. 11/280,594, entitled "COLOR CHANGING PAINT AND VARNISH REMOVER", which was filed on Nov. 17, 2005 now U.S. Pat. No. 7,304,021.

BACKGROUND OF THE INVENTION

1. Field of the Invention

This invention generally relates to a color change paint and varnish remover. More specifically, the present invention provides for a paint removal formulation having a color change feature to indicate when the stripping action of the formulation has substantially ceased and is ready for removal. The formulation comprises: at least one penetrant, at least one carrier and at least one colorant whereby the formulation is applied to the target area and as the surface of the formulation dries, the penetrant migrates away from the dehydrating surface and a surface crust of beads are formed; the beads have a particle size that allows the scattering of visible light into white light and produces the whitening and dilution of the visible color. This color change indicates that the stripping action of the formulation has ceased and is ready for the scraping and removal step.

2. Description of the Related Art

The term "paint and varnish remover" as used herein refers to chemical compositions which can strip or remove all types of coatings, such as, paints, lacquers, enamels, varnishes, shellac, polyurethane, epoxies, and other coatings used on substrates such as metal and wood.

Methylene chloride paint strippers have long been the standard for stripper performance. Although effective in stripping action, high volatility shortens the working time for paint and varnish removal, often requiring more than one application when used on thicker accumulations of paint. In addition, the environmental concerns and the potential carcinogenic effects based on lab tests on mice and rats, have led to ever increasing regulations concerning its use.

Other solvents, such as toluene, xylene, methanol, acetone, ethanol in addition to being flammable, are themselves or in various combinations also highly volatile, requiring multiple applications when thick accumulations of paint are to be removed, and therefore suffer because their work life is insufficient to permit complete penetration of the paint layers before drying out.

The use of safer solvents to replace methylene chloride and flammable paint and varnish removers, are well documented in previous patents. N-methyl-2-pyrrolidone (NMP) has long been employed as the main active ingredient in various paint stripper compositions that offer safer alternatives to methylene chloride and flammable solvent compositions. (NMP) costs over four times as much as methylene chloride, and as much as ten times as much as common flammable alternatives, and various attempts have been made by adding less costly components to (NMP) mixtures, while still maintaining removal properties. U.S. Pat. Nos. 4,120,180; 4,749,510; 5,006,279; and 5,015,410 all refer to various combinations of (NMP) and various aromatic hydrocarbons and other additives to maintain removal efficiency and lower overall costs. Unfortunately, such aromatic hydrocarbons are under increasing regulatory pressures as hazardous air pollutants, and their insolubility in water makes them more difficult to remove from the surface by water washing. Furthermore, these aromatic (NMP) blends, using recommended thickeners, primarily of the cellulosic type, suffer from poor sag resistance, especially when sheared by rapid brushing action or spraying. This leads to insufficient thickness of paint and varnish remover to penetrate effectively, before drying out. U.S. Pat. Nos. 4,666,626 and 4,732,695 refer to paint and varnish removers based on oxy hexyl acetate/cyclohexanone compositions, and benzyl alcohol, aromatic hydrocarbon/(NMP) compositions, respectively, which rely on cellulosic thickeners that sag or drip pulling the paint and varnish remover away from the paint surface so that direct contact is lost. The loss of contact destroys penetrability before drying out.

U.S. Pat. Nos. 5,098,591; 5,124,062; 5,167,853; and 5,298,184 refer to paint and varnish removers based on combinations of (NMP) and various citrus terpene solvents. These compositions also contain cellulosic type thickeners, as well as organoclay thickening agents to aid in sag resistance and to control flow. U.S. Pat. No. 5,035,829 utilizes primarily (NMP), acids and aklylene glycol ethers, and relies on cellulosic thickeners, and is used to remove over spray from spray booths. U.S. Pat. Nos. 5,049,300; 5,098,592, and 5,154,848, disclose compositions containing (NMP) and or (BLO) gamma-butyrolactone, and ethyl 3-ethoxyproprionate (EEP) using cellulosic type thickeners to provide thickening and sag resistance.

Thus, there remains a need in the art to provide an effective paint and varnish stripper which has better sag resistance, especially on vertical surfaces, while maintaining stripping effectiveness, along with the lower toxicities, volatilities, and environmental benefits that are outlined in various patents, while avoiding the use of methylene chloride, toluene, methyl ethyl ketone, acetone, methanol or other highly volatile and/or flammable components.

Most traditional strippers containing methylene chloride or other volatile and flammable chemicals such as methanol, methyl ethyl ketones, acetone or toluene, and strip paint quickly, but will remove only 1 or 2 layers per application.

In the color change formulations, the natural color of the components fades to off-white when the stripping action has substantially ceased. The addition of a coloring agent, such as a dye or a pigment, to the compositions in the range of up to 2%, will intensify the color change (i.e. a medium green to off-white or a pale green) to signal better to the applicator that removal should begin. In addition, with the advent of modern day safer stripper formulations, the resulting stripping actions tend to be much slower than paint and varnish removers based on methylene chloride, and other volatile, flammable solvents or combinations thereof, so that it is difficult to determine when the striping action is finished.

Furthermore, it is well known in the art, that modern day paints, based on latexes, because of their tendency to buckle, swell and blister cause difficulties in maintaining contact with the layers of paint to be stripped. The stripping agent is pulled away from the surface by the buckled and blistered paint. Often this results in the paint stripper and loosened top layers of paint to drop from the sub-layer of paint producing a loss of direct contact with the paint stripper. The loss of direct contact requires additional application of paint stripper. Thus, there remains a need in the art to provide an effective paint and varnish remover which has better sag resistance, very low odor, a signaling device to indicate the completion of paint stripper action, and an effective way to prevent the excessive bubbling, blistering and swelling that can lead to the types of problems described herein.

Furthermore, despite the present of surfactants and other wetting agents, soaps and the like, it has been proven through experimentation that many of the compositions and formulas fail to loosen the paint layers sufficiently if dried to the point where little or no liquid is present. Therefore, there remains a need in the art for a paint and varnish remover that is removable at any stage wet or dry, even when the remover has totally dried.

It is advantageous if these improvements in the state of the art also has lower volatilities and, environmental benefits that are outlined in various other patents referenced, while avoiding the use of methylene chloride, toluene, methyl ethyl ketone, acetone, methanol, ethanol or other highly volatile and/or flammable components.

The color change feature of the present invention signals the completion of the paint stripper action and indicates the time at which the paint stripper is ready to be removed along with the softened paint layers. The paint and varnish stripper of the present invention is biodegradable, non-flammable, odor free and easily cleaned up with water. It contains no methylene chloride or caustic. It truly clings to vertical surfaces. It removes most varieties of paints and varnishes, which are oil or water-based including latexes, stains, alkyds, and polyurethane. It can be applied on a multitude of interior and exterior surfaces including wood, brick, plaster, metal, marble, masonry, concrete and fiberglass. It also strips significantly more paint than traditional paint strippers.

SUMMARY OF THE INVENTION

In one embodiment, the present invention relates to a paint removal formulation having a color change feature to indicate when the stripping action of the formulation has ceased and is ready for removal; the formulation comprises: at least one penetrant, at least one carrier and at least one colorant whereby the formulation is applied to the target area and there is a color change to indicate that the stripping action of the formulation has ceased and is ready for the removal step.

In another embodiment, the penetrant is selected from a group consisting of NMP, benzyl alcohol, ethyl lactate, dimethyl adipate, dimethyl glutarate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis(lactate), dimethyl sulfoxide, soy solvents, D-limonene and mixtures thereof.

In still another embodiment, the carrier is selected from a group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof. In yet another embodiment, the colorant is selected from a group consisting of dye, pigments and mixtures thereof. In a further embodiment, the penetrant is selected from a group consisting of methylene chloride, toluene, methyl ethyl ketone, acetone, methanol, xylenes, mineral spirits, hi-flash naptha and mixtures thereof. In still yet another embodiment, the formulation further comprises water.

In still yet another embodiment, the colorant migrates away from a surface of the formulation as the surface of the formulation dries. In another embodiment, the carrier partially dehydrates and emits white light as the surface of the formulation dries.

In a further embodiment, the formulation comprises from about 5 to about 55% by weight of the penetrant, from about 2 to about 50% by weight of the carrier, from about 0.01 to about 2.0% by weight of the colorant and from about 15 to about 50% by weight of the water.

In another embodiment, the formulation further comprises at least one thickening agents, said thickening agents being selected from a group consisting of Fullers earth, clay, attapulgite, montmorillonite, magnasol, klucel H, hydroxyethyl cellulose, hydroxypropyl cellulose, methocel and mixtures thereof. In still another embodiment, the formulation further comprises at least one wetting agent, said wetting agent being selected from a group consisting of propylene glycol, butylene glycol, ethylene glycol, diethylene glycol, triethylene glycol, tetraethylene glycol, pentaethylene glycol, neopentyl glycol, diethylene glycol monomethyl ether, monomethyl ethers of triethylene glycol, tetraethylene glycol, pentaerythritol, dipentaerythritol, neopentyl glycol and mixtures thereof.

In yet another embodiment, the formulation further comprises at least one activator, the activator being selected from a group consisting of formic acid, acetic acid, glycolic acid, hydroxyacetic acid, chloroacetic acid, fluoroacetic acid, oxalic acid, lactic acid and mixtures thereof.

In still yet another embodiment, the present invention provides for a colored paint removal product that becomes a paler color of the product after it has been applied to the target area, has softened the paint and is ready for removal. In a further embodiment, the product comprises: at least one penetrant, at least one carrier, and at least one colorant whereby the product, when applied to the target area, changes color as the surface of product dries, the carrier partially dehydrates emitting white light and the colorant migrates away from the dehydrating surface. In one embodiment, the colored product becomes white to indicate that the stripping action of the product has ceased and is ready for scraping or removal step. More particularly, the product changes color by a whitening process whereby the colorant migrates away from the dehydrating surface leaving the finely divided carrier to emit white light. In another embodiment, the colored product becomes paler than its original color to indicate that the stripping action of the product has ceased and is ready for the removal step.

In another embodiment, the method of manufacturing a paint removal composition that changes color to indicate that the stripping action of the composition has substantially ceased and is ready for the scraping or removal step, comprises admixing at least one penetrant, at least one carrier, and at least one colorant whereby the composition is applied to the target area and as the surface of the composition dries, the carrier partially dehydrates emitting white light as the colorant migrates away from the dehydrating surface. Hence, there is a color change to indicate that the stripping action of the product has substantially ceased and paint or varnish is ready for removal. For purposes of this invention and this embodiment, the term substantially can mean from about 50 to about 95% of the stripping action of the composition has occurred and the user may begin scraping and removing the paint layers from the medium. For purposes of this invention, the terms "scraping" and "removal" may mean the same thing. In another embodiment, the term "scraping" may mean the back and forth motion by the user utilizing a stripping or scraping tool. In a further embodiment, the term "removal" may mean the overall process of removing the paint with the paint removal composition.

In still another embodiment, the method further comprises admixing water. In yet another embodiment, the formulation comprises from about 5 to about 50% by weight of the penetrant, from about 2 to about 50% by weight of the carrier, from about 0.01 to about 2.0% by weight of the colorant and from about 15 to about 50% by weight of the water.

In still yet another embodiment, the method further comprises admixing at least one thickening agents, the thickening agents being selected from a group consisting of Fullers earth, clay, attapulgite, montmorillonite, magnasol, klucel H, hydroxyethyl cellulose, hydroxypropyl cellulose, methocel and mixtures thereof.

In another embodiment, the method further comprises admixing at least one wetting agent, the wetting agent being selected from a group consisting of propylene glycol, butylene glycol, ethylene glycol, neopentyl glycol, diethylene glycol, triethylene glycol, tetraethylene glycol, pentaethylene glycol, diethylene glycol monomethyl ether, monomethyl ethers of triethylene glycol, tetraethylene glycol, pentaerythritol, dipentaerythritol, neopentyl glycol and mixtures thereof.

In yet another embodiment, the method further comprises admixing at least one activator, the activator being selected from a group consisting of formic acid, acetic acid, glycolic acid, hydroxyacetic acid, chloroacetic acid, fluoroacetic acid, oxalic acid, lactic acid and mixtures thereof.

In still another embodiment, the method of manufacturing a paint removal composition that changes color to indicate that a stripping action of the composition has substantially ceased and is ready for a scraping step, the method comprises admixing at least one penetrant, at least one carrier, and at least one colorant whereby the composition is applied to the target area and there is a color change to indicate that the stripping action of the composition has substantially ceased and is ready for scraping and removal, the penetrant is selected from a group consisting of NMP, benzyl alcohol, ethyl lactate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis(lactate), dimethyl sulfoxide, soy solvents, D-limonene and mixtures thereof, and the carrier is selected from a group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof.

In a further embodiment, the penetrant and/or carrier of the formulation of the present invention has an inherent color and the color from the penetrant and/or carrier is instrumental in the color change. In still a further embodiment, the formulation comprises another component, not a colorant, that has an inherent color and the color from this component is instrumental in the color change. In another further embodiment, a color changing paint and varnish removal product is provided and the product comprises at least one penetrant and at least one carrier, and the color of the product derived from the color of the penetrant changes when the stripping action of the product has substantially ceased and the paint or varnish is ready for removal. In another embodiment, the penetrant is the colorant.

In still a further embodiment, the carrier of the present invention and the composition's viscosity may add additional benefits and results including but not limited to safe short-term human skin contact with the product or composition. In yet a further embodiment, the carrier may also function to mask the odor of other ingredients in the formulation thereby allowing for an odor free or odorless composition. In still yet a further embodiment, the present invention provides for better sag resistance and an effective way to prevent the excessive bubbling, blistering and swelling associated with problems relating to modem day paints, in particular, latex paints.

In another embodiment, the present invention relates to a paint removal formulation having a color change feature to indicate when the formulation is ready for removal, the formulation comprises: at least one penetrant, at least one water insoluble carrier and at least one color visible colorant whereby the formulation is applied to the target area and there is a color change to indicate when the stripping action of said formulation has ceased and is ready for removal, said penetrant is selected from a group consisting of dimethyl adipate, dimethyl glutarate, dimethyl succinate, butyl alcohol, ethyl alcohol, isopropyl alcohol, tertiary butyl alcohol, methyl alcohol, di-iso butyl ketone, methyl amyl ketone, butyl acetate, tertiary butyl acetate, isobutyl iso-butyrate, diethyl ether, ethylene glycol methyl ether, ethylene glycol butyl ether, turpentine, aromatic hydrocarbon, cyclohexanone, isophrone, heptane, hexane, kerosene, lacquer diluents, rubber solvent, benzene, chlorobenzene, cyclohexanol, monoethanolamine and mixtures thereof, and said water insoluble carrier is selected from a group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof, and said colorant is selected from a group consisting of dye, pigments and mixtures thereof.

In a further embodiment, the formulation has a viscosity from about 1200 cps to about 4500 cps. In another further embodiment, the formulation is a semi-solid. In still another further embodiment, the colored paint removal product that becomes a paler color of the product after the product is applied to the target area, has softened the paint and is ready for removal, the product comprises: at least one penetrant, at least one water insoluble carrier, and at least one color visible colorant whereby the product is applied to the target area and as the surface of the product dries, the carrier partially dehydrates emitting white light as the colorant migrates away from the dehydrating surface and the product becomes paler than its original color to indicate that the stripping action of the product has ceased and is ready for the removal step, the product having a viscosity from about 1200 cps to about 4500 cps.

In yet a further embodiment, the method of manufacturing a paint removal composition that changes color to indicate that a stripping action of said composition has substantially ceased and is ready for a scraping step, said method comprising admixing at least one penetrant, at least one water insoluble carrier, and at least one color visible colorant whereby the composition is applied to the target area and there is a color change to indicate that the stripping action of the composition has substantially ceased and is ready for scraping and removal, the penetrant is selected from a group consisting of NMP, benzyl alcohol, ethyl lactate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis(lactate), dimethyl sulfoxide, soy solvents, D-limonene, methylene chloride, toluene, methyl ethyl ketone, acetone, methanol, xylenes, mineral spirits, hi-flash naptha, dimethyl adipate, dimethyl glutarate, dimethyl succinate, butyl alcohol, ethyl alcohol, isopropyl alcohol, tertiary butyl alcohol, methyl alcohol, di-iso butyl ketone, methyl amyl ketone, butyl acetate, tertiary butyl acetate, isobutyl iso-butyrate, diethyl ether, ethylene glycol methyl ether, ethylene glycol butyl ether, turpentine, aromatic hydrocarbon, cyclohexanone, isophrone, heptane, hexane, kerosene, lacquer diluents, rubber solvent, benzene, chlorobenzene, cyclohexanol, monoethanolamine and mixtures thereof, and the carrier is selected from a group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof, and the composition having a viscosity from about 1200 cps to about 4500 cps.

In another embodiment, as the product or formulation dries, water vaporizes from the surfaces and the residual liquid penetrant migrates from the surface toward the stripper-paint interface carrying along the color pigment. These two concurrent or simultaneous actions produce a surface crust of tiny gelatinous beads in the particle size regime of 200 to 2000 nanometers as the topography. These particles scatter the visible light (Mie Scattering) into white light and produce the whitening and dilution of the visible color.

In a further embodiment, the drying of the formulation and the migration of the penetrant produces a surface crust of beads, the beads having a particle size that scatter visible light into white light and produces the whitening and dilution of the visible color. In another further embodiment, the particle of the beads is from about 200 to about 2,000 nanometers. In yet another further embodiment, the carrier partially dehydrates emitting white light as the surface of the formulation dries.

In still another embodiment, the penetrant and/or carrier is either colorless, white or opaque and the colorant has a distinctive color; thus, when the colorant migrates away from the surface of the product, the visible color on the surface of the product will be a faded or lighter color of the colorant. For example, a green colorant and a white, colorless or opaque penetrant and/or carrier will cause the product to change from a green to light green when the stripping action has ceased and is ready for removal. In still a further embodiment, the the penetrant and/or carrier has a different color from the color of the colorant; thus, when the colorant migrates away from the surface of the formulation, the visible color on the surface of the formulation will be influenced by the color of the penetrant and/or carrier. For example, a blue colorant and a green pentrant and/or carrier will cause the product to change from blue to green when the stripping action has ceased and is ready for removal.

In still yet another embodiment, the formulation and products of the present invention uses hydroxypropyl cellulose ("Methocel") as a thickener and the penetrant is NMP; NMP has a low density and by using Methocel, there are no pH problems, no problems with dealing with the low density of NMP; and the formulation is stable and does not separate. In a further embodiment, the Methocel is added in the early stages of manufacturing to form the gel of the formulation and Methocel gel is responsible for keeping all of the raw material together and prevents them from separating out. In another further embodiment, the acrylic polymer emulsion acts as a binder and further prevents the ingredients in the formulation from separating.

DETAILED DESCRIPTION OF THE INVENTION

As required, detailed embodiments of the present invention are disclosed herein; however, it is to be understood that the disclosed embodiments are merely exemplary of the invention that may be embodied in various forms. Therefore, specific functional details disclosed herein are not to be interpreted as limiting, but merely as a basis for the claims and as a representative basis for teaching one skilled in the art to employ the present invention in various ways.

The specific examples below will enable the invention to be better understood. However, they are given merely by way of guidance and do not imply any limitation.

EXAMPLE 1

One embodiment of the paint and varnish remover of the present invention marketed under the trademark "READY STRIP® PLUS" was tested to determine if it would indicate a color change when the remover was finished working and was ready for the stripping step. In addition, the stripping steps were conducted at different time intervals to evaluate further the number of layers of paint removed at such time intervals. The time intervals included times prior to color change, at color change and after color change.

Test Sample

A pine plank measuring $9 \frac{3}{16}$ inches wide by $72 \frac{3}{16}$ inches long by 0.748 (¾) inch thick painted with twelve (12) coats of paint of varying colors was the test sample. Each paint coat was visible from one end of the plank by successive receding starting points of four (4) inch spacing for each paint coat. Prior to applying the first paint coat, the pine plank had been sealed with a varnish sanding sealer and sanded with sandpaper.

Paint Materials

The paints used were as follows in the identified sequence of application: 1.) Black latex flat enamel; 2.) White hi-gloss, interior/exterior alkyd spray enamel; 3.) Wildflower Blue latex satin enamel; 4.) Claret Wine latex satin enamel; 5.) Taupe latex satin enamel; 6.) Hunter Green interior/exterior alkyd spray enamel; 7.) Cinnamon latex satin enamel; 8.) White hi-gloss latex enamel; 9.) Banner Red hi-gloss, interior/exterior alkyd spray enamel; 10.) Black latex flat enamel; 11.) Yellow hi-gloss, interior/exterior alkyd spray enamel; and 12.) Wildflower Blue latex satin enamel.

Instruments

The average film thickness per paint coat was ascertained by measuring the pine plank with a vernier micrometer following the sanding step and following the dried twelve (12) coats of paint. The paint scrapers used were a triangular drag scraper with a stainless steel blade measuring 6.2 cm (2.44 inches) per edge and a "five-in-one" flat blade paint scraper with a stainless steel blade measuring 5.8 cm (2.283 inches). The applicators for applying the paint strippers were two-inch wide paint brushes.

Paint Application Procedure

The pine board (plank) was first coated with a varnish sanding sealer and allowed to dry overnight [about sixteen (16) hours]. The board was sanded with 220 grain sandpaper to provide a smooth sealed wood surface. The paint coatings were applied with successive receding starting points at four (4) inch spacings so that each paint coat remained visible and traceable. The order of the paint coat deposition was black, white, blue, claret wine, taupe, hunter green, cinnamon, white, banner red, black, yellow, and blue. After the application of each paint coat, the paint was allowed to dry for four (4) hours. The first two (2) hours of drying was at ambient temperature which varied from 81° F. to 92° F. during the ambient drying step for the twelve (12) paint coats. The last two (2) hours, the drying was carried out under a hot air stream that varied in temperature between 105° F. to 122° F. After the third, the sixth, and the ninth paint coats, the entire drying was at ambient temperature overnight (14-16 hours). The overnight temperatures varied between 78° F. to 90° F. Following the final paint coat, the painted plank was left to cure for one hundred seventeen (117) hours under conditions of controlled temperature and humidity. The controlled curing environment was a temperature of 70° F. and humidity of 40-45%.

The dry film thickness of the twelve coats (12) of paint measured, with the vernier micrometer, 0.5 mm or 19.685 mil. The average dry paint coat thickness calculates to be 1.64 mil.

Ready Strip Application Procedure:

The READY STRIP® PLUS was applied to the top paint coat (blue) covering the eleven (11) paint coats beneath it. Both paint strippers were applied to cover a rectangular section of the painted plank that measured approximately 9½ inches by 3¼ inches with a thickness sufficient to mask the top paint color (blue). As initially applied, the READY STRIP PLUS had a medium green color. The Plus paint stripper turned color as the active ingredients penetrated the twelve (12) paint coats. The READY STRIP® PLUS changed color from medium green to a pale green after twenty-four (24) hours.

The test results of Example 1 are set forth in Table 1 below:

TABLE 1

| Stripper | Time | Elapsed Time, Hours | Paint Coats Removed |
|---|---|---|---|
| READY STRIP ® PLUS | 5$^{15}$ pm (Aug. 09, 2005) | 4 | 4 |
| READY STRIP ® PLUS | 9$^{15}$ pm (Aug. 09, 2005) | 8 | 7 |
| READY STRIP ® PLUS | 1$^{15}$ pm (Aug. 10, 2005) | 24 | 12 |
| READY STRIP ® PLUS | 1$^{15}$ pm (Aug. 12, 2005) | 72 | 12$^b$ |

$^b$The READY STRIP ® PLUS had dried to a hard layer. Water was layered over the dried paint stripper and allowed to soak into the stripper for about ten (10) minutes. The hydrated paint stripper was able to be penetrated with the drag scraper and twelve paint coats came off easily.

The stripping action was tested prior to full color change (partial color change) at the 4$^{th}$ and 8$^{th}$ hour of testing and only four (4) and seven (7) layers of paint, respectively were removed. The full color change (medium green to pale green) occurred at the 24$^{th}$ hour and all twelve (12) layers of paint were removed. In addition, the 72$^{nd}$ hour was also tested and the color remained changed, and all twelve (12) layers were removed.

EXAMPLE 2

Another embodiment of the paint and varnish remover of the present invention marketed under the trademark "READY STRIP® PRO" was tested to determine if it would indicate a color change when the remover was finished working and was ready for the stripping step. Again, the stripping steps were conducted at different time intervals to further evaluate the number of layers of paint removed at such time intervals. The time intervals included times prior to color change, at color change and after color change.

Test Sample:

A pine plank measuring 9³⁄₁₆ inches wide by 72³⁄₁₆ inches long by 0.748 (¾) inch thick painted with twelve (12) coats of paint of varying colors was the test sample. Each paint coat was visible from one end of the plank by successive receding starting points of four (4) inch spacing for each paint coat. Prior to applying the first paint coat, the pine plank had been sealed with a varnish sanding sealer and sanded with sandpaper.

Paint Materials:

The paints used were as follows in the identified sequence of application: 1.) Black latex flat enamel; 2.) White hi-gloss, interior/exterior alkyd spray enamel; 3.) Wildflower Blue latex satin enamel; 4.) Claret Wine latex satin enamel; 5.) Taupe latex satin enamel; 6.) Hunter Green interior/exterior alkyd spray enamel; 7.) Cinnamon latex satin enamel; 8.) White hi-gloss latex enamel; 9.) Banner Red hi-gloss, interior/exterior alkyd spray enamel; 10.) Black latex flat enamel; 11.) Yellow hi-gloss, interior/exterior alkyd spray enamel; and 12.) Wildflower Blue latex satin enamel.

Instruments:

The average film thickness per paint coat was ascertained by measuring the pine plank with a vernier micrometer following the sanding step and following the dried twelve (12) coats of paint. The paint scrapers used were a triangular drag scraper with a stainless steel blade measuring 6.2 cm (2.44 inches) per edge and a "five-in-one" flat blade paint scraper with a stainless steel blade measuring 5.8 cm (2.283 inches). The applicators for applying the paint strippers were two-inch wide paint brushes.

Paint Application Procedure:

The pine board (plank) was first coated with a varnish sanding sealer and allowed to dry overnight [about sixteen (16) hours]. The board was sanded with 220 grain sandpaper to provide a smooth sealed wood surface. The paint coatings were applied with successive receding starting points at four (4) inch spacings so that each paint coat remained visible and traceable. The order of the paint coat deposition was black, white, blue, claret wine, taupe, hunter green, cinnamon, white, banner red, black, yellow, and blue. After the application of each paint coat, the paint was allowed to dry for four (4) hours. The first two (2) hours of drying was at ambient temperature which varied from 81° F. to 92° F. during the ambient drying step for the twelve (12) paint coats. The last two (2) hours, the drying was carried out under a hot air stream that varied in temperature between 105° F. to 122° F. After the third, the sixth, and the ninth paint coats, the entire drying was at ambient temperature overnight (14-16 hours). The overnight temperatures varied between 78° F. to 90° F. Following the final paint coat, the painted plank was left to cure for one hundred seventeen (117) hours under conditions of controlled temperature and humidity. The controlled curing environment was a temperature of 70° F. and humidity of 40-45%.

The dry film thickness of the twelve coats (12) of paint measured, with the vernier micrometer, 0.5 mm or 19.685 mil. The average dry paint coat thickness calculates to be 1.64 mil.

Ready Strip Application Procedure:

The READY STRIP® PRO was applied to the top paint coat (blue) covering the eleven (11) paint coats beneath it. The Pro paint stripper was applied to cover a rectangular section of the painted plank that measured approximately 9½ inches by 3¼ inches with a thickness sufficient to mask the top paint color (blue). As initially applied, the READY STRIP® PRO had a medium brown color. The Pro paint strippers turned color as the active ingredients penetrated the twelve (12) paint coats. The READY STRIP® PRO substantially turned color from a medium brown to a very light tan at the eight (8) hour mark and fully turned color from medium brown to off-white after twenty-four (24) hours.

The test results of Example 2 are set forth in Table 2 below:

TABLE 2

| Stripper | Time | Elapsed Time, Hours | Paint Coats Removed |
|---|---|---|---|
| READY STRIP ® PRO | 5$^{15}$ pm (Aug. 09, 2005) | 4 | 4 |
| READY STRIP ® PRO | 9$^{15}$ pm (Aug. 09, 2005) | 8 | 12 |
| READY STRIP ® PRO | 1$^{15}$ pm (Aug. 10, 2005) | 24 | 12 |
| READY STRIP ® PRO | 1$^{15}$ pm (Aug. 12, 2005) | 72 | 12$^a$ |

$^a$The READY STRIP ® PRO had crusted over but was sufficiently pliable so that the drag scraper was able to cut through the crust and remove the twelve (12) paint coats.

The stripping action was tested prior to full color change (partial color change) at the 4$^{th}$ hour of testing and four (4) layers of paint were removed. A substantial color change (brown to light tan) occurred at the 8$^{th}$ hour of testing and all twelve (12) layers of paint were removed. The full color change (brown to off-white) occurred at the 24$^{th}$ hour and all twelve (12) layers of paint were removed. In addition, the 72$^{nd}$ hour was also tested and the color remained changed, and all twelve (12) layers were removed.

EXAMPLE 3

The formulation and product of the present invention was also tested for safety for human skin contact. The Ready Strip® Product is a gelatinous semi-solid and not a free flowing liquid such as an aqueous solution of NMP in water. This test compares the Ready Strip Product with a 10-15% aqueous solution of NMP. The molecular movement of NMP from the contracting agent onto the skin of the hand is governed by Fick's molecular transport equation, which is stated below.

$$J = -(RT/f)(dc/dx) = -D(dc/dx) \qquad \text{A)}$$

Where:
J=flux density in moles cm$^{-2}$ s$^{-1}$
R=gas constant=8.31451×10$^7$ dynes cm K$^{-1}$ mol$^{-1}$
T=temperature in degrees Kelvin
f=friction coefficient
D=diffusion coefficient in cm$^{-2}$ s$^{-1}$
dc/dx=concentration gradient or the entropic driving force for molecular movement from higher concentration to lower
Where, f, the friction coefficient is
f=3πηd
η=viscosity in poise or dynes cm$^{-2}$ (g cm$^{-1}$ s$^{-1}$)
d=diameter of hydrated NMP molecule (NMP 3H$_2$O)= 4.73×10$^{-8}$ cm calculated via $\Phi_d$=0.2457 (MW)$^{0.588}$; $\Phi_d$0.2457 (153.1793)$^{0.588}$
So that, f=(44.6246×10$^{-6}$ cm)(η), and the molecular flux equation becomes:

$$J = -(RT/3\pi\eta d)(dc/dx) \qquad \text{B)}$$

Isolating the independent impact of viscosity.

$$J = -(1/\eta)(RT/3\pi d)(dc/dx) \qquad \text{C)}$$

And quantifying RT/3πd, the molecular flux equation becomes $$J = -(1/\eta)(5.56 \times 10^{16} \text{ dynes mol}^{-1}\, dc/dx) \qquad \text{D)}$$

As equation D portrays, the molecular transport from the NMP containing agent to the hand is totally controlled by the concentration gradient (dc/dx) and the viscosity (η). Since the concentration gradient is not being varied, the only independent component controlling the flux is the viscosity. The relationship of the viscosity to the molecular transport of the NMP to the hand from the NMP containing agent is a reciprical one. As the viscosity increases, the transport flux of NMP decreases proportionally.

The viscosity of a 10-15% aqueous solution of NMP is reported to be at 3.3-4.0 centipoise (cp) at 25° C.

The measured viscosity of the Ready Strip® Product is 4,064 cp at 25° C.

The ratio of the viscosity of the Ready Strip® Product to the viscosity of a 10-15% NMP water solution is 1,016. Consequently, the molecular transport to the hand of NMP from the water solution is 1,016 times faster than the corresponding transport of NMP from the Ready Strip® Product. At the same concentration, NMP will be absorbed by a hand in contact with the Ready Strip® Product at a rate factor of the ratio of the viscosities as calculated below:

$$\text{Rate Factor} = \left[ \frac{\text{viscosity of the NMP aqueous solution/}}{\text{viscosity of the Ready Strip®}} \right]$$
$$= [4 \text{ cp}/4,064 \text{ cp}]$$
$$= 9.8 \times 10^{-4}$$

Consequently, the rate of absorption from the Ready Strip® Product is 9.8×10$^{-4}$ times the rate of absorption of NMP onto a hand immersed in an aqueous solution of NMP.

With the NMP flux density of 30 μg cm$^{-2}$ hr$^{-1}$ for a 10-15% NMP aqueous solution, a hand in such a solution for one hour would transfer 12,600 μg of NMP from the aqueous solution to one hand.

For one hand in one hour: J=(30 μg cm$^{-2}$ hr$^{-1}$)(420 cm$^2$) =12,600 μg/hr For two hands in one hour: J=12,600 μg/hr for one hand× 2=25,200 μg/hr Whereas, a hand in the Ready Stripe® Product for one hour would transfer to one hand 12.4 μg.

For one hand in one hour: J=(30 μg cm$^{-2}$ hr$^{-1}$)(420 cm$^2$)/ 1016=12.4 μg/hr For two hands in one hour: J=12.4 μg/hr for one hand× 2=24.8 μg/hr Proposition 65 provides for a dermal maximum allowable dose level (MADL) of 17,000 μg NMP/day. Testing has shown that the total absorbed dose of NMP from the Ready Strip® Product, whether it is one or two hands, is far below the Proposition 65 MADL.

Assuming a more reasonable contact time of five (5) minutes, the aqueous solution will transfer 1,050 μg of NMP in 5 minutes, whereas the Ready Strip® Product would transfer 1.03 μg of NMP in 5 minutes.

In conclusion, and as a consequence of the gelatinous, semi-solid nature of the Ready Strip® Product, its high viscosity and its slow rate of absorption, dipping one's hand into the Ready Strip® Product transfers exceeding small quantities of NMP to the body through the hands, quantities well below the maximum allowable dose level (MADL) of 17,000 μg NMP/day. NMP is not considered a toxic molecule and shows no human skin irritation over a twenty-four (24) hour exposure. Thus, the Ready Strip® Product is safe for short-term contact with human skin.

EXAMPLE 4

The product and formulation of the present invention was also clinically tested for safety to short term human skin contact. The studies included the evaluation of the dermal tolerance of the product on twenty-six (26) subjects (both male and female ranging in ages 19 to 65 years) following a brief exaggerated application regimen. The regimen is as follows: the Product was applied to two test sites on each subject (left and right forearms); the Product was allowed to remain on both arms for one (1) hour; the first arm was rinsed with warm tap water for approximately 30 seconds; the second arm was wiped off using a soft disposable cloth and two (2) hours after application, the wiped arm was rinsed with warm water for approximately 30 seconds. Dermal irritation and sensation were measured at the one (1) hour point after washing and wiping of the respective arms and two (2) hours after the washing of the second arm. Twenty-four (24) and forty-eight (48) hours after removal, the subjects returned to the lab and the dermal assessments were repeated.

The test results showed no clinically significant reactions were observed. After two (2) hours, all twenty-six (26) subjects showed no skin irritation or sensation to the Product. After twenty-four (24) hours and forty-eight (48) hours, twenty-five out of the twenty-six subjects showed no skin irritation and sensation to the Product [the lab concluded that the twenty-sixth subject (subject number 11) had pimples which were caused by an outside factor (shaving)].

Based on the Clinical Studies, the testing facility has concluded that the following claims can be made for the Ready Strip® Product: "Clinically shown to be safe for human skin contact"; "Safety tested for human skin contact"; "Dermatologically tested"; "So safe . . . you can put your hands in it"; and "Independent laboratory testing has shown Ready Strip® to be safe for human skin contact".

Therefore, while the embodiments of the present invention disclosed herein are presently considered to be preferred, various changes and modifications can be made without departing from the spirit and scope of the invention. The scope of the invention is indicated in the appended claims, and all changes that come within the meaning and range of equivalents are intended to be embraced therein.

What is claimed is:

1. A method of manufacturing a paint removal composition with a color change feature, said method comprising: admixing at least one penetrant, at least one water insoluble carrier, and at least one color visible colorant, prior to admixing, selecting at least one penetrant from the group consisting of NMP, benzyl alcohol, ethyl lactate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis(lactate), dimethyl sulfoxide, soy solvents, D-limonene, methylene chloride, toluene, methyl ethyl ketone, acetone, methanol, xylenes, mineral spirits, hi-flash naptha, dimethyl adipate, dimethyl glutarate, dimethyl succinate, butyl alcohol, ethyl alcohol, isopropyl alcohol, tertiary butyl alcohol, methyl alcohol, di-iso butyl ketone, methyl amyl ketone, butyl acetate, tertiary butyl acetate, isobutyl iso-butyrate, diethyl ether, ethylene glycol methyl ether, ethylene glycol butyl ether, turpentine, aromatic hydrocarbon, cyclohexanone, isophrone, heptane, hexane, kerosene, lacquer diluents, rubber solvent, benzene, chlorobenzene, cyclohexanol, monoethanolamine and mixtures thereof, and said carrier is selected from the group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof, and creating a color changing paint stripper composition whereby said stripper composition is designed to be applied to a target area and said stripper composition changes from a visibly distinct color to a shade of white when said stripper composition with stripped paint is ready for scraping and removal.

2. The method of claim 1 wherein said stripper composition is a semi-solid, said composition being safe for short term human skin contact.

3. The method of claim 1 further comprising admixing water.

4. The method of claim 3 wherein said stripper composition comprises from about 5 to about 55% by weight of said penetrant, from about 2 to about 50% by weight of said carrier, from about 0.01 to about 2.0% by weight of said colorant and from about 15 to about 50% by weight of said water.

5. The method of claim 1 further comprising: admixing at least one thickening agent, said thickening agent being selected from the group consisting of Fullers earth, clay, attapulgite, montmorillonite, magnasol, klucel H, hydroxyethyl cellulose, hydroxypropyl cellulose, methocel and mixtures thereof.

6. The method of claim 1 further comprising: admixing at least one wetting agent, said wetting agent being selected from the group consisting of propylene glycol, butylene glycol, ethylene glycol, diethylene glycol, triethylene glycol, tetraethylene glycol, pentaethylene glycol, diethylene glycol monomethyl ether, monomethyl ethers of triethylene glycol, tetraethylene glycol, pentaerythritol, dipentaerythritol, neopentyl glycol and mixtures thereof.

7. The method of claim 1 further comprising: admixing at least one activator, said activator being selected from the group consisting of formic acid, acetic acid, glycolic acid, hydroxyacetic acid, chloroacetic acid, fluoroacetic acid, oxalic acid, lactic acid and mixtures thereof.

8. The method of claim 1 further comprising: admixing at least one surfactant.

9. The method of claim 1 wherein said colorant is selected from the group consisting of dye, pigments and mixtures thereof.

10. A color changing paint stripper manufactured by a method comprising: selecting at least one penetrant from the group consisting of NMP, benzyl alcohol, ethyl lactate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis(lactate), dimethyl sulfoxide, soy solvents, D-limonene, methylene chloride, toluene, methyl ethyl ketone, acetone, methanol, xylenes, mineral spirits, hi-flash naptha, dimethyl adipate, dimethyl glutarate, dimethyl succinate, butyl alcohol, ethyl alcohol, isopropyl alcohol, tertiary butyl alcohol, methyl alcohol, di-iso butyl ketone, methyl amyl ketone, butyl acetate, tertiary butyl acetate, isobutyl iso-butyrate, diethyl ether, ethylene glycol methyl ether, ethylene glycol butyl ether, turpentine, aromatic hydrocarbon, cyclohexanone, isophrone, heptane, hexane, kerosene, lacquer diluents, rubber solvent, benzene, chlorobenzene, cyclohexanol, monoethanolamine and mixtures thereof, selecting at least one water insoluble carrier from the group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof, and selecting at least one colorant from the group consisting of dye, pigments and mixtures thereof, admixing said penetrant, said water insoluble carrier, and said color visible colorant and creating a color changing paint stripper which is designed to be applied to a painted area and changes from a first visibly distinctive color to a second visibly distinctive color when the paint has been stripped and is ready for removal.

11. The method of claim 10 further comprising: admixing at least one thickening agent, and selecting said thickening agent from the group consisting of Fullers earth, clay, attapulgite, montmorillonite, magnasol, klucel H, hydroxyethyl cellulose, hydroxypropyl cellulose, methocel and mixtures thereof.

12. The method of claim 10 further comprising: admixing at least one wetting agent, and selecting said wetting agent from the group consisting of propylene glycol, butylene glycol, ethylene glycol, diethylene glycol, triethylene glycol, tetraethylene glycol, pentaethylene glycol, diethylene glycol monomethyl ether, monomethyl ethers of triethylene glycol, tetraethylene glycol, pentaerythritol, dipentaerythritol, neopentyl glycol and mixtures thereof.

13. The method of claim 10 further comprising: admixing at least one activator, and selecting said activator from the group consisting of formic acid, acetic acid, glycolic acid, hydroxyacetic acid, chloroacetic acid, fluoroacetic acid, oxalic acid, lactic acid and mixtures thereof.

14. The method of claim 10 further comprising: admixing water.

15. The method of claim 14 wherein said stripper comprises from about 5 to about 55% by weight of said penetrant, from about 2 to about 50% by weight of said carrier, from about 0.01 to about 2.0% by weight of said colorant and from about 15 to about 50% by weight of said water.

16. The method of claim 10 wherein said stripper has a viscosity from about 1200 cps to about 4500 cps and is a semi-solid.

17. A color changing paint stripping formulation manufactured by a process comprising:
  selecting at least one penetrant from the group consisting of NMP, benzyl alcohol, ethyl lactate, diethyl adipate, diethyl glutarate, ethyl benzoate, dimethyl succinate, diethyl succinate, dimethyl phthalate, diethyl phthalate, dimethyl terphthalate, diethyl terphthalate, ethylene bis (lactate), dimethyl sulfoxide, soy solvents, D-limonene, methylene chloride, toluene, methyl ethyl ketone, acetone, methanol, xylenes, mineral spirits, hi-flash naptha, dimethyl adipate, dimethyl glutarate, dimethyl succinate, butyl alcohol, ethyl alcohol, isopropyl alcohol, tertiary butyl alcohol, methyl alcohol, di-iso butyl ketone, methyl amyl ketone, butyl acetate, tertiary butyl acetate, isobutyl iso-butyrate, diethyl ether, ethylene glycol methyl ether, ethylene glycol butyl ether, turpentine, aromatic hydrocarbon, cyclohexanone, isophrone, heptane, hexane, kerosene, lacquer diluents, rubber solvent, benzene, chlorobenzene, cyclohexanol, monoethanolamine and mixtures thereof;
  selecting at least one water insoluble carrier from the group consisting of polysaccharides, starch, cellulose, polydextran, chitosan, chitin, limestone, metal oxides, aluminum silicates, hydrated aluminates, sodium magnesium silicates, barium sulphates, ferroxides, magnesium aluminum silicates and mixtures thereof:
  selecting at least one colorant from the group consisting of dye, pigments and mixtures thereof; and
  admixing said penetrant, said water insoluble carrier, said color visible colorant and water to create a color changing paint stripper which is has a viscosity of from about 1200 cps to about 4500 cps and is a semi-solid, said color changing paint stripper is designed to be applied to a painted area and change from a first visibly distinctive color to a second visibly distinctive color when the paint has been stripped and is ready for removal.

18. The process of claim 17 wherein said color changing paint stripping formulation comprises from about 5 to about 55% by weight of said penetrant, from about 2 to about 50% by weight of said carrier, from about 0.01 to about 2.0% by weight of said colorant and from about 15 to about 50% by weight of said water.

19. The process of claim 17 further comprising:
  selecting at least one thickening agent from the group consisting of Fullers earth, clay, attapulgite, montmorillonite, magnasol, klucel H, hydroxyethyl cellulose, hydroxypropyl cellulose, methocel and mixtures thereof;
  selecting at least one wetting agent from the group consisting of propylene glycol, butylene glycol, ethylene glycol, diethylene glycol, triethylene glycol, tetraethylene glycol, pentaethylene glycol, diethylene glycol monomethyl ether, monomethyl ethers of triethylene glycol, tetraethylene glycol, pentaerythritol, dipentaerythritol, neopentyl glycol and mixtures thereof;
  selecting at least one activator from the group consisting of formic acid, acetic acid, glycolic acid, hydroxyacetic acid, chloroacetic acid, fluoroacetic acid, oxalic acid, lactic acid and mixtures thereof; and
  admixing said thickening agent, said wetting agent and said activator to said color changing paint stripping formulation.

20. The process of claim 17 wherein said color changing paint stripping formulation is applied to a target area and as the surface of product dries, said colorant migrates away from the dehydrating surface and the drying of the product and the migration of said penetrant forms a surface crust of beads, said beads having a particle size from about 200 to about 2,000 nanometers, said particle size allows for scattering of visible light into white light thereby causing the product to change color to indicate that said product with the paint is ready for the removal step.

* * * * *